(12) United States Patent
Mimar (10) Patent No.: US 7,126,991 B1
(45) Date of Patent: Oct. 24, 2006

(54) METHOD FOR PROGRAMMABLE MOTION ESTIMATION IN A SIMD PROCESSOR

(75) Inventor: Tibet Mimar, 1040 Gloucester Ct., Sunnyvale, CA (US) 94087

(73) Assignee: Tibet Mimar, Bradenton, FL (US)

( * ) Notice: Subject to any disclaimer, the term of this patent is extended or adjusted under 35 U.S.C. 154(b) by 168 days.

(21) Appl. No.: 10/357,804

(22) Filed: Feb. 3, 2003

(51) Int. Cl.
*H04N 7/18* (2006.01)
(52) U.S. Cl. .......................... 375/240.16; 375/240.17; 375/240.25; 375/240.26
(58) Field of Classification Search .............................. 375/240.11–240.29, 240.01; 348/710–725
See application file for complete search history.

(56) References Cited

U.S. PATENT DOCUMENTS

| | | | | |
|---|---|---|---|---|
| 4,924,306 A | * | 5/1990 | van der Meer et al. ...... | 348/701 |
| 5,210,605 A | * | 5/1993 | Zaccarin et al. ........ | 375/240.16 |
| 5,398,068 A | * | 3/1995 | Liu et al. ................ | 375/240.16 |
| 5,928,316 A | * | 7/1999 | Wong et al. ................. | 708/501 |
| 5,943,250 A | * | 8/1999 | Kim et al. ................... | 708/625 |
| 5,943,251 A | * | 8/1999 | Jiang et al. .................. | 708/710 |
| 5,949,486 A | * | 9/1999 | Ishihara et al. ........... | 348/402.1 |
| 6,049,859 A | * | 4/2000 | Gliese et al. ................. | 712/17 |
| 6,058,465 A | * | 5/2000 | Nguyen ......................... | 712/7 |
| 6,078,941 A | * | 6/2000 | Jiang et al. .................. | 708/625 |
| 6,434,196 B1 | * | 8/2002 | Sethuraman et al. ... | 375/240.12 |
| 6,578,063 B1 | * | 6/2003 | Kojima et al. .............. | 708/708 |
| 6,654,419 B1 | * | 11/2003 | Sriram et al. .......... | 375/240.12 |
| 2002/0001343 A1 | | 1/2002 | Challapali | |
| 2002/0097343 A1 | | 7/2002 | Rovati | |

OTHER PUBLICATIONS

Peter Kuhn, Algorithms, Complexity Analysis and VLSI Architectures for MPEG-4 Motion Estimation (continued) Kluwer Academic Publishers, ISBN-0-7923-8516-0, 1999.

* cited by examiner

*Primary Examiner*—Andy Rao (57) ABSTRACT

The present invention provides a 16×16-sliding window using vector register file with zero overhead for horizontal or vertical shifts to incorporate motion estimation into SIMD vector processor architecture. SIMD processor's vector load mechanism, vector register file with shifting of elements capability, and 16×16 parallel SAD calculation hardware and instruction are used. Vertical shifts of all sixteen-vector registers occur in a ripple-through fashion when the end vector register is loaded. The parallel SAD calculation hardware can calculate one 16-by-16-block match per clock cycle in a pipelined fashion. In addition, hardware for best-match SAD value comparisons and maintaining their pixel location reduces the software overhead. Block matching for less than 16 by 16 block areas is supported using a mask register to mask selected elements, thereby reducing search area to any block size less than 16 by 16.

4 Claims, 7 Drawing Sheets

Illustration of Motion-Estimation.

Figure 1. Illustration of Motion-Estimation.

Figure 2. Illustration of Horizontal Shifts of Search Area.

Figure 3. Video Processor Programmers' Model.

Figure 4. VP-4000 Motion Estimation.

Figure 5. Illustration of Motion-Estimation Load/Shift/Copy Operations.

BSAD          BLOCK SAD VECTOR INSTRUCTION
(Vector Processor)

Format:
    BSAD. [Options]    [XADDR, YADDR]

Options:
R     : Reset best SAD values to maximum possible value.
L     : Load before SAD calculation (mutually exclusive with S option)
S     : Shift before SAD calculation (mutually exclusive with L option)

Examples:
BSAD.RL     XADDR, YADDR     // Reset SAD values; Load vectors; Specify Addresses
BSAD.L      XADDR, YADDR     // Load vectors; Specify Addresses
BSAD.S                                        // Shift; Post-Increment X address.

Operation (Described using pseudo-C):

```
If (L Option and S Option) Generate assembler warning;
if ( R Option) current_SAD = MAX_VALUE;
If (L Option)
   for (i = 0; i< 15; i++)
      VRME_SHIFT[i] ← VRME[i];

else if (S Option)              // Horizontal Shift of Search Area
for (j=0; j < 16; j++)
   for (i = 0; i < N; i++)
       VRME_SHIFT [i] [j] ← VRME_SHIFT [i + 1] [j];  // Second Index specifies element.
   }

// SAD Calculation
current_SAD = 0;
for (i=0; i < 16; i++)
   for (j=0; j < 16; j++)
      {
          k = i * j;
          if (VRA15_k == 0)       //Check if mask bit is set
          ref_reg = k / N;
          ref_element = k % N;
          current_SAD += abs (VRME_SHIFT[j][i]_{7..0} - VRA[ref_reg][ref_element]_{7..0};
      }

//Compare Against Previous Best Value
If (current_SAD <= best_SAD)
   {
       best_SAD = current_SAD;
       best_X = current_X;
       best_Y = current_Y;
   }
```

Where N is the number of elements in SIMD processor.

Figure 6. BSAD Instruction Detailed Description.

LDVME  Load Motion Estimation Vector Register
             (Scalar Processor)

Format:

LDVME   Offset-12 (Rn)

Condition Codes Affected: None.

Opcode Coding: Offset in opcode is Offset [11:1] of assembly specification.

Description:
    Loads VRME registers using ripple-through load from VRME15. Offset is defined as an unsigned number.

Operation:
    EA ← (Rn [31:1] || 0) + ($0^{24}$ || $Offset_{11..1}$ || $0^1$)

If (Offset [0] != 0) Generate assembler warning

This instruction executes in a single pipelined cycle, and the equivalent operation is sequence in the following top-down order:

```
VRME0  ← VRME1
VRME1  ← VRME2
VRME2  ← VRME3
VRME3  ← VRME4
VRME4  ← VRME5
VRME5  ← VRME6
VRME6  ← VRME7
VRME7  ← VRME8
VRME8  ← VRME9
VRME9  ← VRME10
VRME10 ← VRME11
VRME11 ← VRME12
VRME12 ← VRME13
VRME13 ← VRME14
for (i = 0; i < N; i++)
  {
    VRME15 [i] ← Mem (EA+2*i);
  }
```

Where N is the number of elements in SIMD processor.

Figure 7. LDVME Instruction Detailed Description.

METHOD FOR PROGRAMMABLE MOTION ESTIMATION IN A SIMD PROCESSOR

CROSS-REFERENCE TO RELATED APPLICATION

This application claims priority under 35 U.S.C 119(e) from co-pending U.S. Provisional Application No. 60/354,369 filed on Feb. 4, 2002 by Tibet Mimar entitled "Method for Programmable Motion Estimation in a SIMD Processor", the subject matter of which is fully incorporated herein by reference.

This application is related to our corresponding U.S. patent application Ser. No. 10/357,640 filed on Feb. 3, 2003 titled "Method for Providing Efficient Load of SIMD Vector Registers."

BACKGROUND OF THE INVENTION

1. Field of the Invention

The invention relates generally to the field of processor chips and specifically to the field of single-instruction multiple-data (SIMD) processors. More particularly, the present invention relates to motion estimation in a SIMD processing system.

2. Description of the Background Art

Motion estimation is a basic bandwidth compression method used in video-coding systems. Motion estimation is used by MPEG-1, MPEG-2, MPEG-4, H.261, H.263, and H.264 video compression standards. Block matching using Sum-of-Absolute-Differences (SAD) between a reference block of 16 by 16 luma pixels and a candidate block of 16 by 16 pixels is used, because it is easier to implement SAD instead of the Mean-Square-Error (MSE). SAD subtracts all corresponding pixel values, takes the absolute value of these differences and then sums up all the 256 values together. The lower the value the better the match is, and zero represents the best match. Motion estimation is done by testing different candidate positions to see which one best match the reference block.

Besides video encoding, other applications also use motion estimation including video stabilization in digital camcorders, stitching of multiple digital shots together, and Automatic Target Recognition (ATR) in military applications.

Block matching using SAD of 16 by 16 blocks is the task that requires by far the most processing requirement in video compression. Current systems use dedicated hardware blocks with different levels of parallelism to calculate SAD, because SAD processing requirement exceeds the fastest RISC or DSP processing power. For example, to calculate the SAD for a full search window of +/−32 window in both horizontal and vertical dimensions requires about 152 Billion operations for 30 frames per second at CCIR-601 resolution that have 1620 such reference block.

Therefore, most high-quality video encoding chips have dedicated hardware blocks that calculate a list of motion-vectors indicating best match values for each luma block in a video frame. Even in this case, smaller search areas and hierarchical search at lower resolution is sometimes used to lower processing requirements. For example, first every fourth pixel position is search for the best possible match. Then only the neighborhood of best match is search. This cuts down processing by a factor of 16.

The problem with such dedicated hardware blocks is that they lack the flexibility of a software solution, and also require large amounts of data to be "shipped" to dedicated motion-estimation hardware and the results to be read by a processor.

SIMD and VLIW processors that exist today also perform motion estimation, but based on reduced search areas based on certain assumptions. One such approach is calculating only the neighborhood of expected locations based on neighborhood blocks that are already processed. Such processor can calculate SAD values for 8, 16, or 32 pixels at each clock cycle. Also, the bookkeeping of X-Y locations and best-match values are performed as scalar operations, whereby further reducing the efficiency of software implementation. This is because during these scalar operations most of parallel hardware execution units stay idle.

Reduced search areas and imperfect search results do not cause incorrect results, but reduce video compression and thus the resultant video quality. New video coding techniques also require sub-pixel level block matching to as low as $1/8^{th}$ pixel resolution. This further increases the complexity of both hardware and software solutions.

SUMMARY OF THE INVENTION

SIMD processor architecture, as defined by co-referenced patent application titled "Method for Providing Efficient Load of SIMD Vector Registers", provides flexible vector load operations under software control. The present invention uses a sliding window for candidate block by shifting the elements of group of vector registers under software control using instructions. At each shift position, a pipelined 16-by-16 SAD hardware block calculates the block-match value in parallel for all 256 pixels. SAD inputs are connected to a fixed location in at least two groups of vector registers.

To provide concurrent load of extended search area while multiple SAD match values are calculated at different horizontal shifts points of search area, the other group of vector registers is loaded at the same time. The preferred embodiment uses a dual-issue processor, whereby the scalar processor performs vector load and store and scalar operations, while concurrently the vector unit calculates SAD and other vector operations. To provide vertical shifts of candidate block with a single load instruction, vector registers also provide vertical shifting ability when a new vector register loaded, whereby loading vector register zero, causes all existing vector registers of that group to shift away from the end vector register in a bubble-through fashion. Subsampling of search positions of the grid could be done by loading every K'th line vertically, or by shifting by more than one location horizontally.

The reference block is stored in vector registers, and in preferred embodiment it is stored in alternate vector registers that is only used as source operands. Dedicated hardware maintains best match X-Y locations and corresponding best SAD values. Separate best match value-X-Y data is maintained for odd, even, and all lines for optional interlaced video motion estimation.

In summary, addition of vector register shifting capability, Block SAD vector instruction and best-match logic to the framework of SIMD processors combines the software flexibility of SIMD with the processing power of dedicated hardware.

BRIEF DESCRIPTION OF THE DRAWINGS

The accompanying drawings, which are incorporated and form a part of this specification, illustrated embodiments of the invention, and together with the description, serve to explain the principles of the invention.

FIG. 4 illustrates the operation of motion estimation using vector register groups. One group of vector registers, VRME0 to VRME15, is loaded by a vector load instruction. Loading VRME0 vector register causes all VRME motion-estimation vector registers to be shifted such that all existing VRME registers are shifted in a bubble-through fashion from register one toward fifteen. The shadow registers VRME_SHIFT0 to VRME_SHIFT15 have the ability to shift horizontally by one element. The low bytes of higher 16 elements of these VRME_SHIFT<n> registers are connected to 256 candidate block inputs of the pipelined SAD logic. VRME and VRME_SHIFT<n> vector register group could be limited to byte-size resolution per vector element, since SAD calculations do not typically require higher resolution for all commonly used compression algorithms. The reference inputs of the SAD logic are connected to certain dedicated registers of the alternate vector register file. For a 32-wide SIMD processor, only the first 8 alternate vector registers are used. VAR15 is used as the mask register to disable certain elements from SAD calculation, for reduced block areas or shapes different than 16×16.

DETAILED DESCRIPTION

Present invention uses a SAD block that is fully parallel, which could calculate SAD of a 16×16 block in one pipelined clock cycle. The corresponding 256 8-bit inputs from reference block and candidate block are subtracted from each other using 256 8-bit subtract logic, followed by 256 absolute value logic with 9-bit inputs, followed by a tree-adder of eight levels to obtain a single SAD value. Pipeline registers between each level of logic provides for fast clock rates, and pipelining of multiple SAD instructions one after another. Candidate inputs of the SAD block are connected to fixed position in a set of vector registers such that 16 elements of a vector register is used for each row of the 16×16 block. Reference inputs of SAD block are connected to fixed position in a different group of vector registers. To implement horizontal shifts of the search area between SAD calculations for best-match search, vector register group where candidate inputs are connected have the ability to shift all elements of that group in unison. To implement vertical shifts of the search area, loading a new vector register to vector register 0, causes all 16-vector registers of this group to shift as bubble-through fashion away from the loaded vector register. Adding such horizontal and vertical shifts of multiple vector-registers in unison forms the principle of the present invention. Overlaying the parallel SAD logic inputs to such vector registers provide the flexibility of software feeding the two-dimensional SAD array. Each SAD calculation requires about 756 arithmetic operations (256 subtracts, 256 absolute value, and approximately 255 adders.) At 500 MHz pipelined clock rate, this is equivalent to 377 Billion operations (GOPS) per second. Present invention specifies different ways in which new search area could be loaded concurrently with such SAD calculations in order to be able to sustain the peak computational rate throughout the search. It is also important to maintain value of the best match and its position throughout this search without lowering performance by interleaved scalar operations, which is accomplished by best-match logic that automatically compares current SAD result against previous best match, and also maintains their X-Y position using the information provided by block SAD instruction.

Ideally, new search area could be loaded in parallel and in the background while SAD calculations are performed, and this provides the optimal usage of the hardware. If the vector registers have 32 vector elements, that means once we load 16 vector register we could shift these vector registers horizontally and calculate SAD values for 16 horizontal positions before we need new values, assuming our horizontal search area is equal or larger than 16. There are several methods to load the next vertically or horizontally offsetted search area during these calculations.

Figure 1:
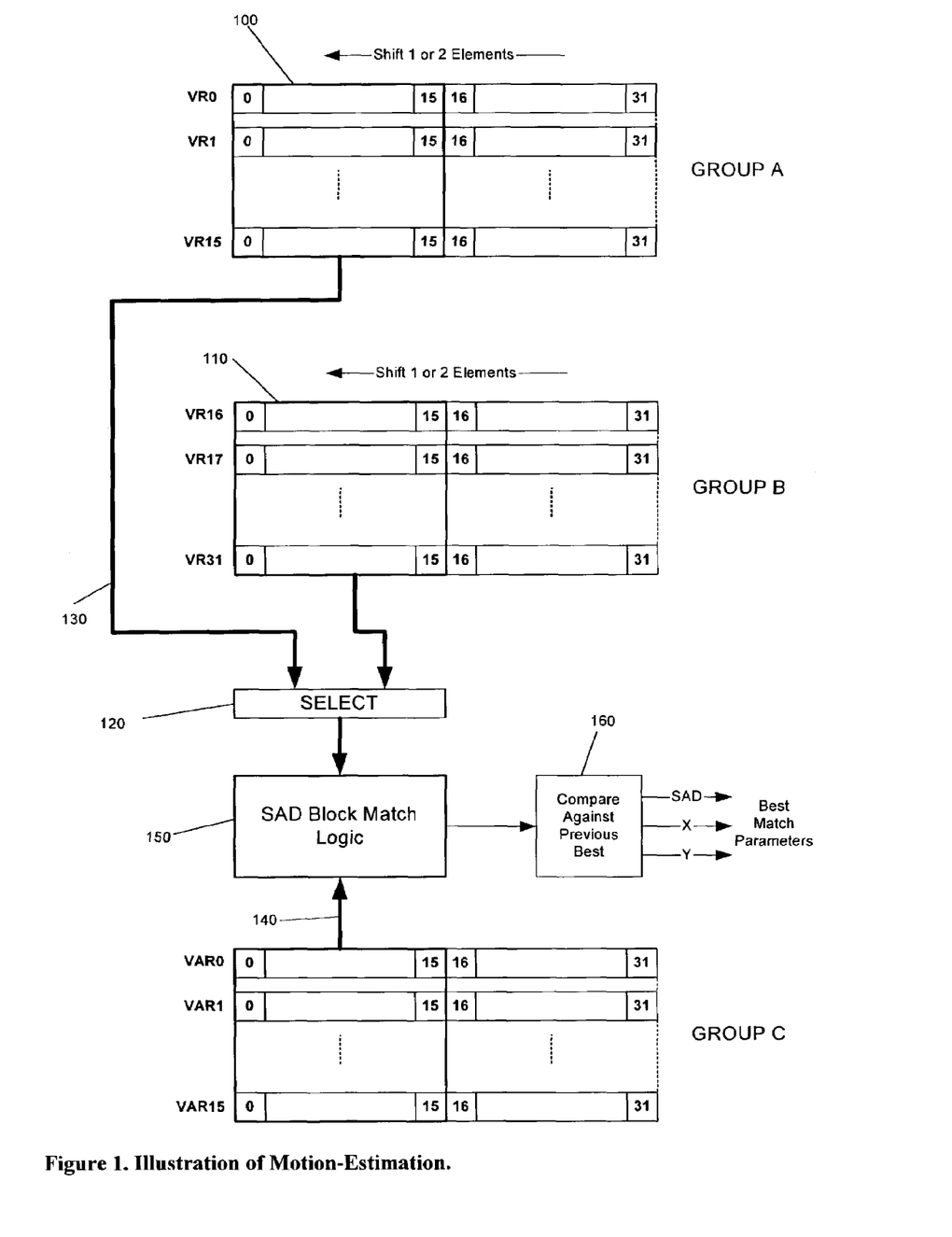
FIG. 1 illustrates performing motion estimation in a SIMD processor using multiple groups of vector registers. One group is used to store the reference block. The other two groups of vector registers are used to alternately load and horizontally shift the search area.

One approach is to use three groups of vector registers as shown in FIG. 1, where each vector register holds 32 vector elements. Each vector element could be any size, byte, 16-bits, or 32-bits fixed or floating point. Only two of the vector register groups, Group A 100 and B 110, has the capability to shift vector elements in the left direction one or two elements. Group A and B will contain search area and Group C will contain the reference block. Candidate block input of the Select logic 120 will choose one of the two groups A and B for input to the SAD block match logic 150. The 16 by 16 candidate block inputs to this Select logic are connected to vector elements 0 through 15 of Group A and B.

The reference block of 16 by 16 is stored in elements 0 through 15 of alternate vector registers VAR0–15 of Group C. This reference block outputs of 16 by 16 pixels, i.e., 256 values, are connected to the reference block inputs of the block matching logic.

Figure 2:
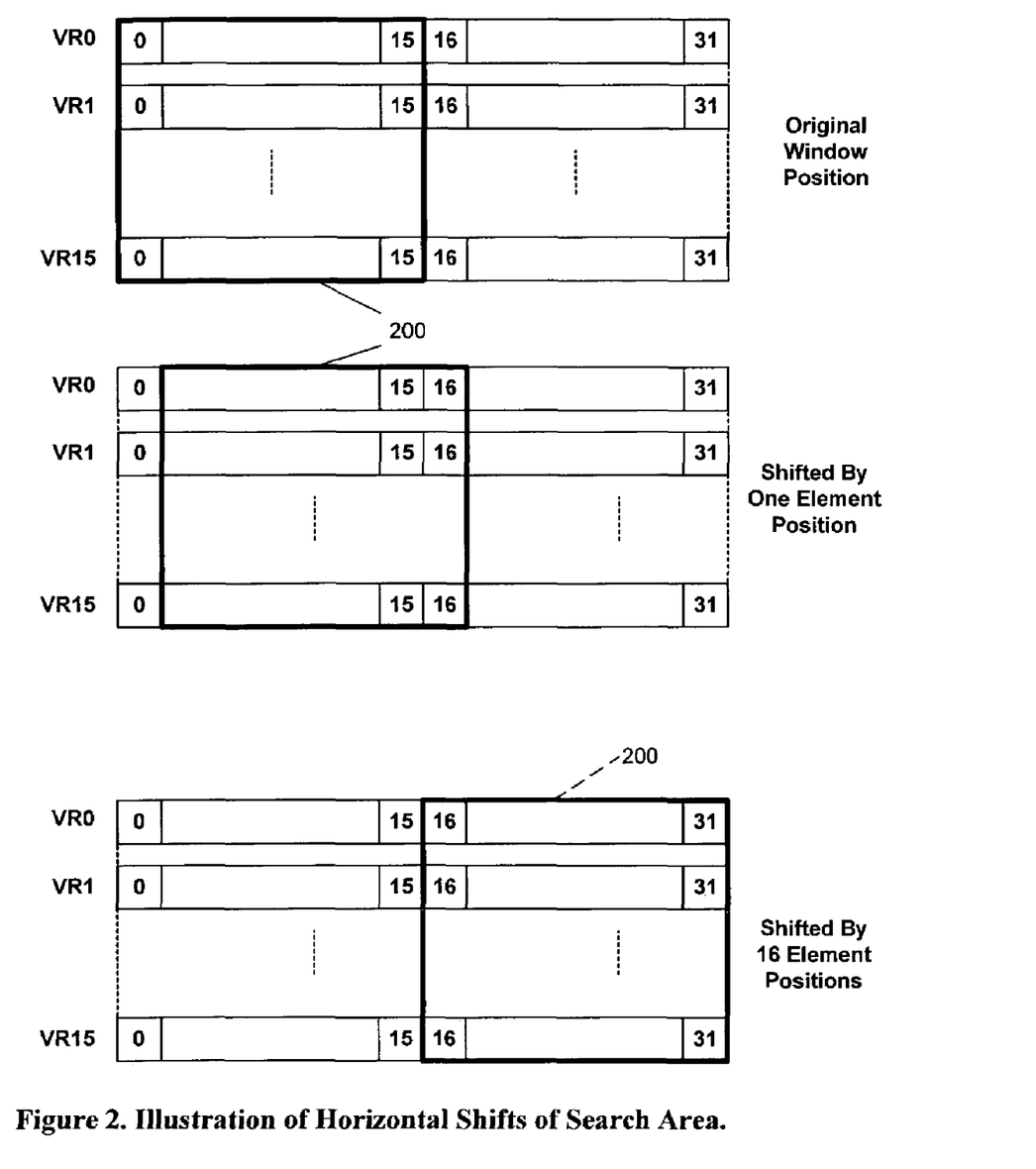
FIG. 2 illustrates shifting the search area to the right horizontally by shifting all vector register elements in unison to the left.

Vector shift operations of selected group occur such that all elements of that group are shifted left by one or two elements in unison. For a shift by one, element #0 of all vector registers of this group are lost, and value zero is shifted into vector #31 position of all elements. This shift operation implements effectively shifting the reference window 200 of 16 by 16 to the right by one or two counts, as illustrated in FIG. 2.

SAD logic 150 takes two sets of 256 values as inputs, one for reference block 140 and one for candidate block as inputs. Block SAD Instruction (BSAD) controls SAD logic and horizontal shifting of vector registers. This instruction also specifies X and Y locations for each SAD calculation in absolute or incremental form. If a BSAD instruction results in a best match, this X and Y value pair is recorded along with the best SAD value (lowest value) by the best-match-compare logic 160.

A typical motion search would require the following steps:
  A. Load Group C vector register elements zero through 15 with reference block that is being searched.
  B. Load Group A vector registers with initial search area of 32 pixels by 16 lines using vector load instructions.
  C. Do the following load and SAD calculations in parallel:
    1. 16 SAD calculations while shifting Group A vectors register elements left by one. This is done by BSAD instruction of the vector processor.
    2. Load Group B vector registers. If more searching is to be done in the horizontal direction, then the horizontally adjacent 32×16 search area is loaded. If search is to be continued in the vertical direction, then the next vertical search window is loaded. To move the search window vertically by one vector load operation.
  D. Repeat step C, but with groups A and B interchanged.

The steps C and D are repeated until the search area is exhausted. Hierarchical search at different pixel resolution levels could be done in two different ways with the present invention. First, is to have multiple levels of pixel resolution, referred to as MIPMAP levels present, and to do search from lowest resolution first. Then, once the best match is found, only the neighborhood of the best match is search in the next lower resolution, continuing into higher resolutions this way into the hierarchy.

Second, each horizontal shift count could be 2 or more, to subsample horizontal search positions. To subsample vertical search positions, sub sampled vertical lines of search window is loaded under software control as required.

To implement sub-pixel resolution, we could use regular SIMD instructions for interpolation, followed by SAD calculation using the SAD Block logic or using software to calculate SAD on a line by line basis, since the number of sub-pixel positions to be searched is not that many.

PREFERRED EMBODIMENT OF INVENTION

Figure 3:
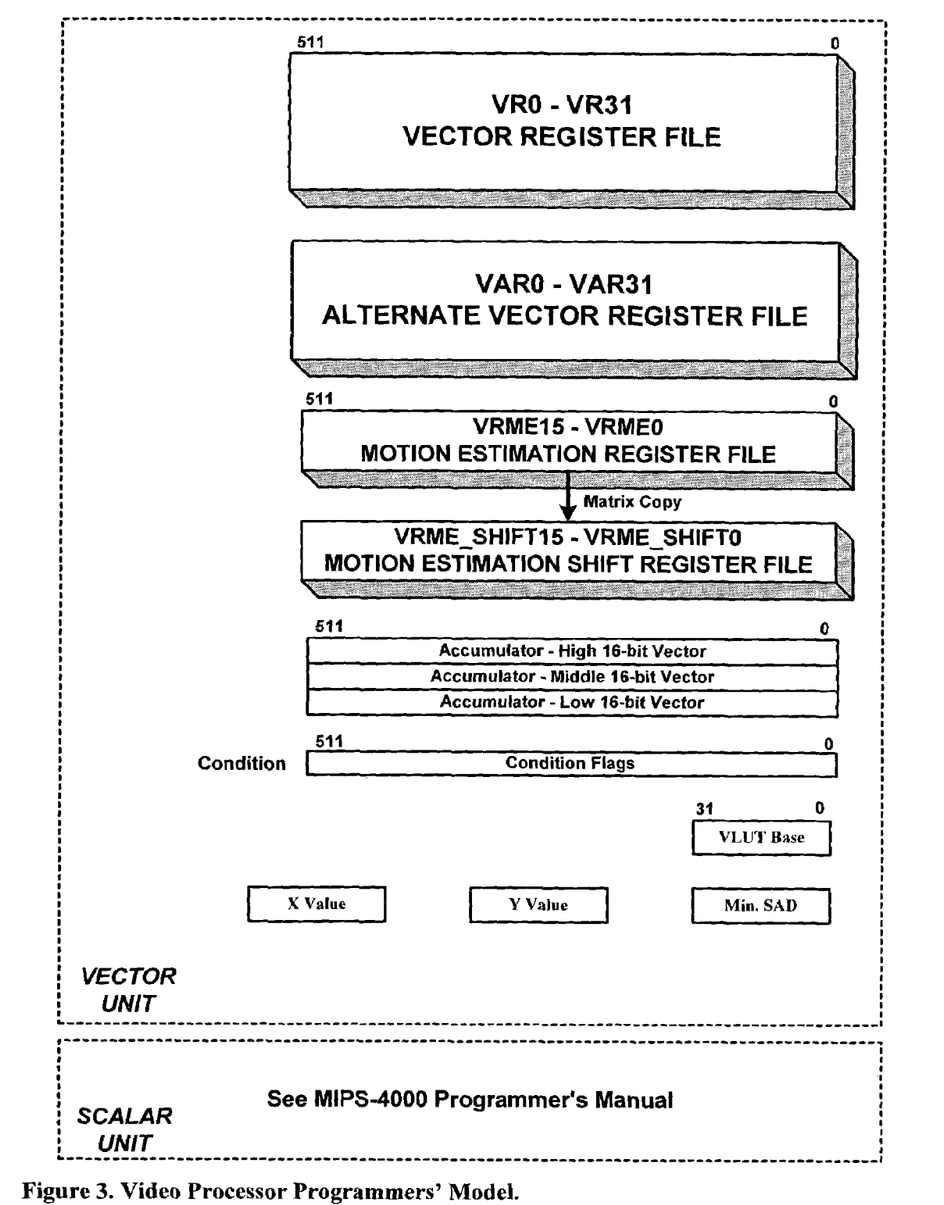
FIG. 3 shows the SIMD programmers' model including motion-vector registers and motion-estimation results. The X and Y position values that is specified by each block-SAD instruction is recorded along with the resultant SAD value, if the SAD value is lower than the previous values recorded.

The above approach to concurrently load the new search area requires multiplexing of 256 8-bit inputs, or 2048 two-input multiplexors. More importantly, this means routing about 2000 signal lines on a chip between different sub-blocks. A more ASIC friendly implementation uses only local connections, which are much easier to route and implement. The preferred embodiment eliminates the multiplexor and instead uses two overlaid vector register files. First set of vector registers could be loaded anytime using vector load instruction of SIMD processor, and loading causes vertical shift of these registers. The second set of vector registers could be shifted horizontally by one, and also this set could be loaded from the first set of vector registers in parallel in a single clock cycle. Loading of the "shadow" second set of vector register and their horizontal shifting is controlled by the block SAD instruction. The flip-flops of these two vector register files are co-located which makes horizontal, vertical shifts, and copying of one vector register to the other requires only local connection. Also, horizontal shifts are reduced from two to one, since multiple levels of resolution could be used to search alternate locations. Programmer's model for the preferred embodiment is shown in FIG. 3.

For the rest of the discussion, we will assume vector registers have 32 elements, although the concept presented here is equally applicable to larger vector sizes, such as 64 elements and more. Actually, larger number of elements makes horizontal search area larger without having to reload. The preferred embodiment of present invention uses a dual-issue processor, whereby one scalar and one vector instruction could be executed at the same time per clock cycle. The scalar instruction also could be any vector load instruction. For example, we would write the following on a given program line:
LDVME 0(R0); BSAD.S [0,0];

Which would load one motion vector register and at the same time, perform one-full SAD calculation. The output of BSAD will be available in X-Value, Y-Value and Min-SAD registers of the programmer's model after a delay of several clock cycles (about 16).

Figure 4:
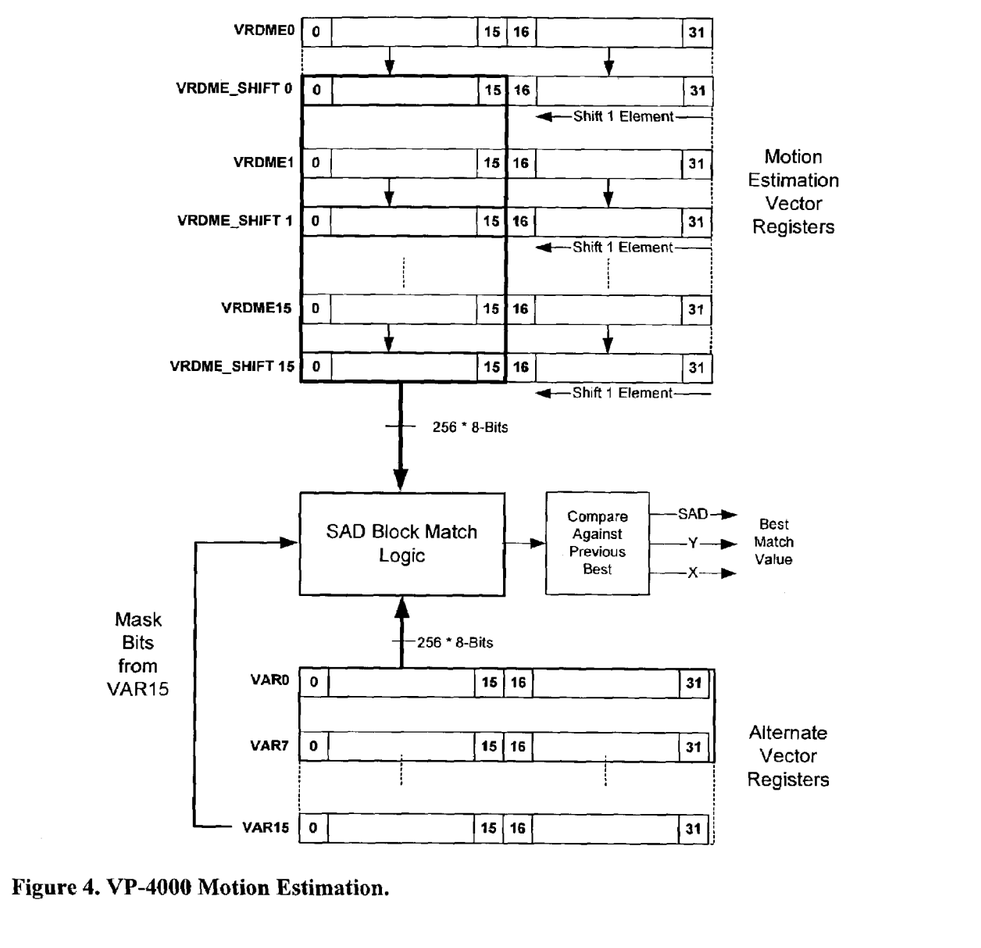

The alternate vector file provides the reference block of 16 by 16 values. Motion vector registers have only 16 registers, as opposed to 32 registers for primary and alternate vector registers. The motion vector registers also consist of two sets of registers. One set of registers, VRME16-1, is where candidate search area of 32(H) by 16(V) is loaded. These registers are copied to motion vector shift registers, VRME_SHIFT<n>, as a matrix copy instruction. The shift registers are capable of shifting all elements of VRME<n>_SHIFT in unison one element to the left with software instructions. The scalar part performs vector load and store and other scalar operations, while concurrently the vector unit calculates block or vector SAD and other vector operations, as shown in FIG. 4.

Figure 5:
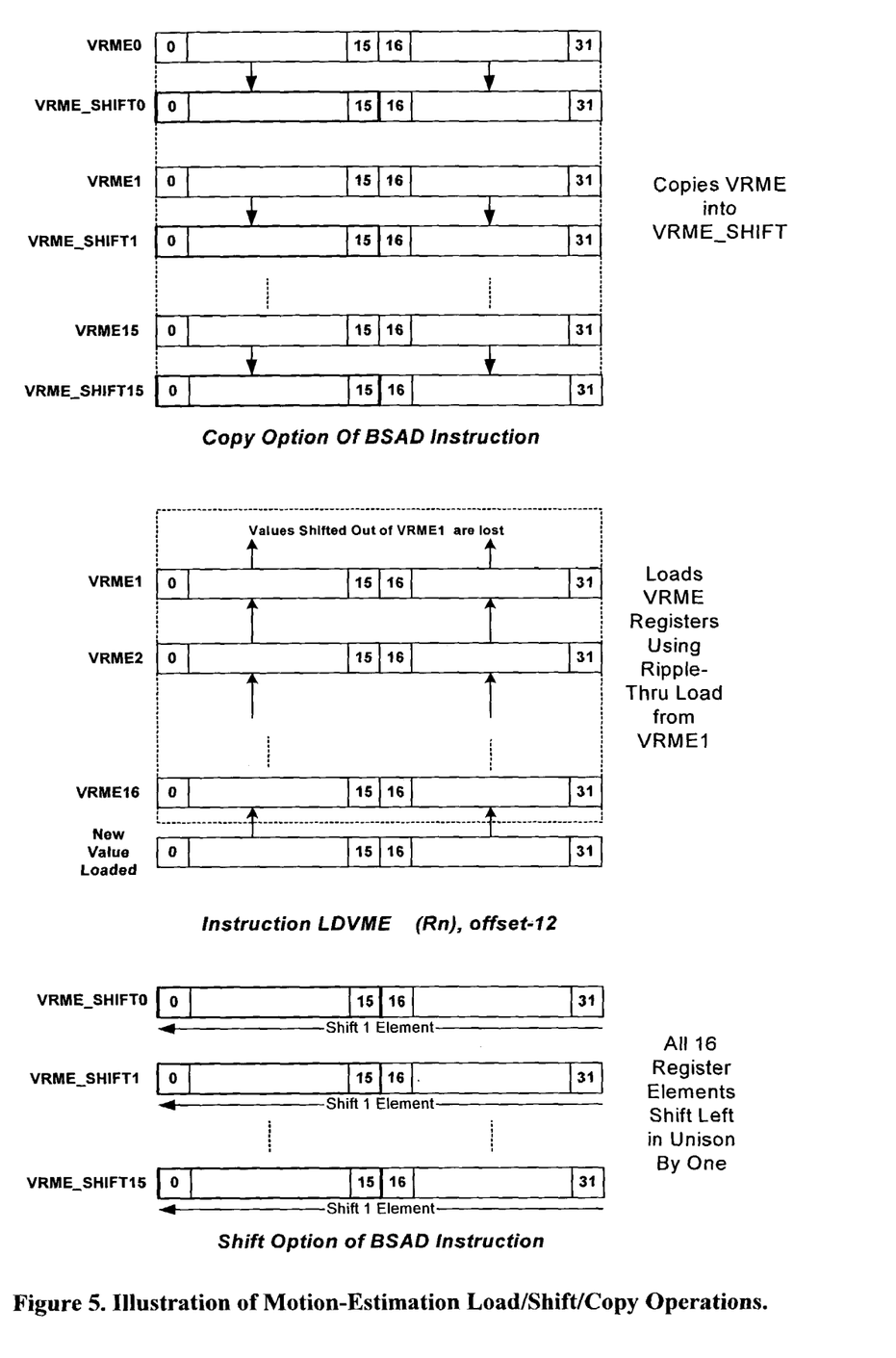
FIG. 5 illustrates the motion-estimation load, shift and copy operations.

There are three types of operations on Motion Vector Registers:
  1. Copy Option of BSAD Instruction: Copying of VRME-register elements into VRME_SHIFT<n> register elements, or vice versa.
  2. LDVME Instruction: Loading a new vector into VRME15 registers, which shifts all existing VRME contents from VRME15 toward VRME0. This allows for easy load and update of search area to move it in the vertical direction with a single vector load instruction.
  3. Shift Option of BSAD Instruction: In addition to matrix SAD calculation, this instruction also optionally shifts elements of all VRME_SHIFT registers left by one element.

These operations are illustrated in FIG. 5.

Dedicated hardware maintains best match X-Y locations and corresponding best SAD values. Separate best match value-X-Y data is maintained for odd, even, and all lines for optional interlaced video motion estimation.

In summary addition of vector register shifting and rippling from register-to-register capability, Block SAD vector instruction and best-match logic to the framework of SIMD processors combines the software flexibility of SIMD with the processing power of dedicated hardware. The following explains the basic details of Vision Processor Motion Estimation implementation:
  A. 2-D block SAD logic candidate inputs are connected to elements zero to fifteen of motion-estimation vector register file to vector register VRME_SHIFT0 to VRME_SHIFT15.
  B. 2-D block SAD logic reference inputs are connected to alternate vector register file registers 1 to 4 and elements 0 through 31. The reason for different connections is to reduce the number of cycles necessary to load the reference block.
  C. Bits of vector register 15 of the reference block input pixels act as mask, disabling pixels, when set to one, from SAD calculation. Such a mask is intended to generate SAD window shapes smaller than 16 by 16.

D. Load Motion Vector Register scalar instruction (LVME) loads 32 elements into motion-estimation vector register number zero, and shifts all previous contents of motion-estimation vector register file from vector register 15 toward 0 by one, when such a vector load performs. In effect, LVME causes the window to move vertically.

E. Copy Motion of BSAD instruction causes all elements of VRME0–15 to be copied to VRME_SHIFT0–15.

F. There is no pause required for loading since block SAD and loading of motion-estimation vector registers could occur concurrently.

Vector shift operations of motion-estimation vector register file occur such that all elements are shifted left by one element in unison. After a shift by block SAD instruction (BSAD), element #31 of all vector registers of VRDME_SHIFT<n> are lost, and zero is shifted into element position #0. This shift operation implements effectively shifting the reference window of 16 by 16 to the right by one count to right.

Figure 6:
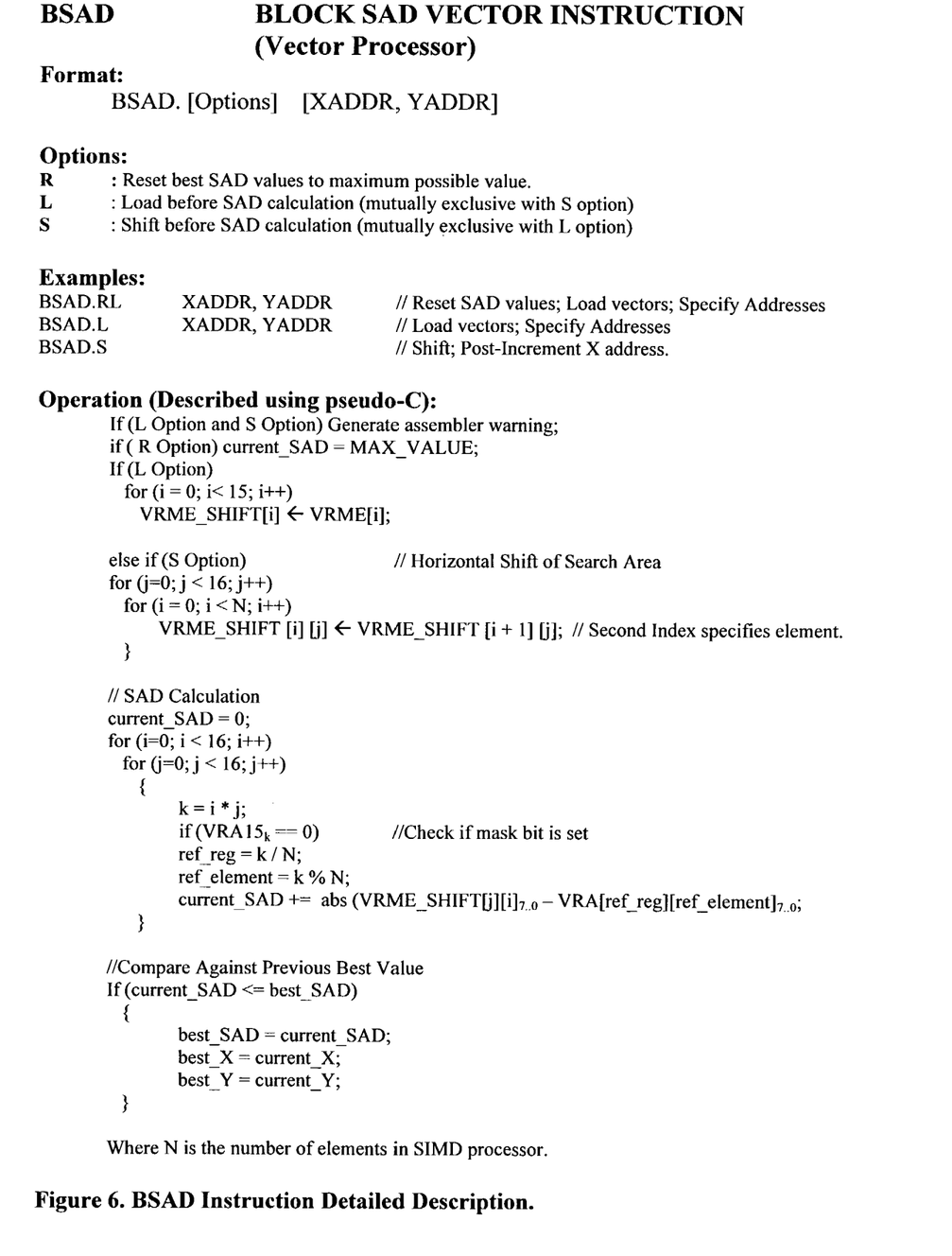
FIG. 6 describes the details of motion-estimation vector register load instruction LDVME. This assumes that MIPS coprocessor-2 type instruction is used for the preferred embodiment and this instruction executes on the scalar portion of a dual-issue processor.
Figure 7:
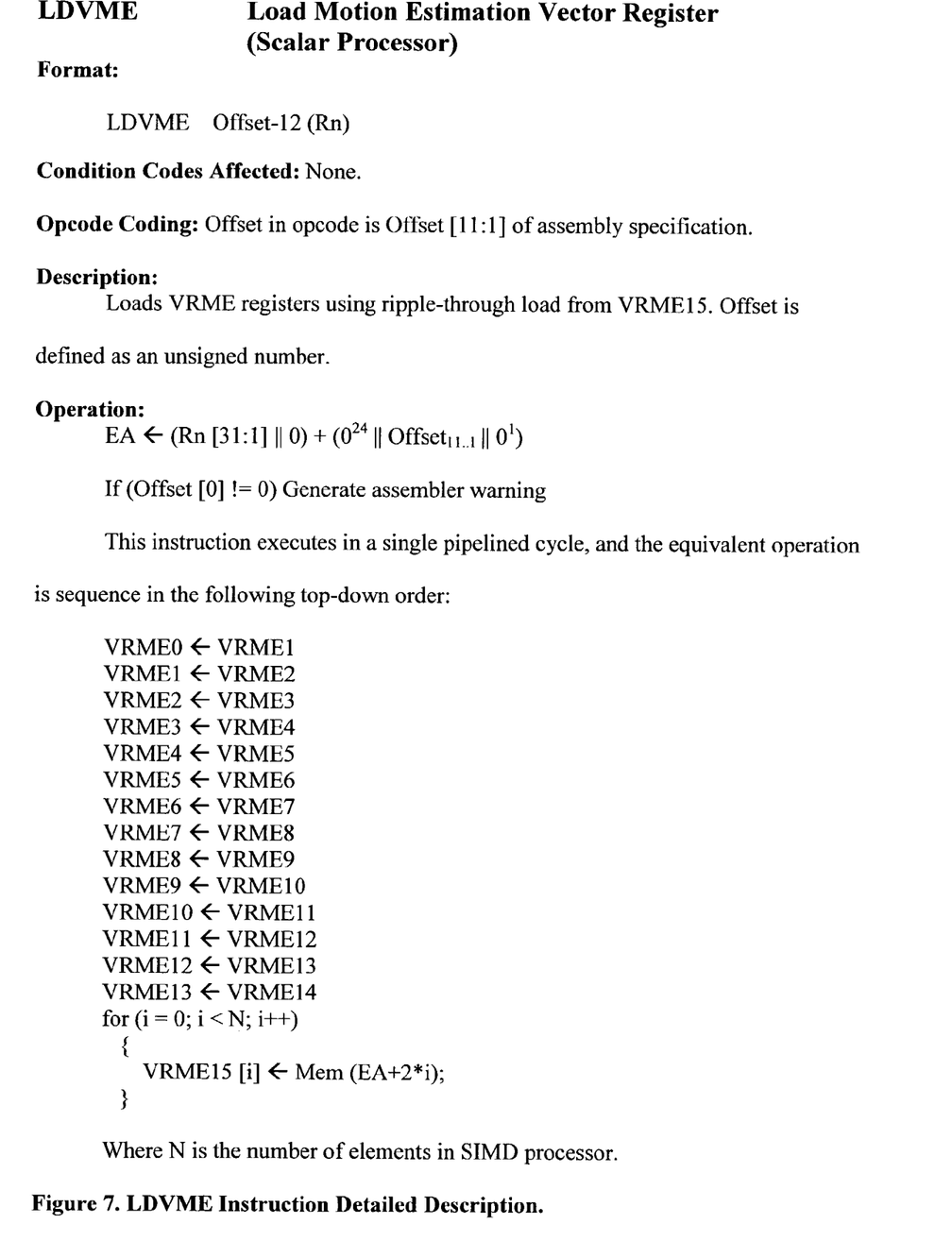
FIG. 7 describes the details of block SAD instruction BSAD, which executes on the vector portion of a dual-issue processor in the preferred embodiment.

FIG. 5 shows the Block SAD Instruction (BSAD) and FIG. 6 shows the details of the Load Motion-Estimation Vector Register (LDVME) instruction. The "s" option selects whether to shift horizontally or not. BSAD instruction optionally specifies X and Y locations in absolute or relative incremental form for each SAD calculation. This X and Y value pair is recorded by the best-match-compare logic if a BSAD instruction results in a best match.

A typical motion search would require the following steps:

A. Load alternate vector register elements 16 through 31, elements 0 through 15 with reference block that is being searched. Set mask bits in VAR15 to one, to exclude those elements from SAD calculation. This is to aid setting up SAD windows smaller than 16×16 size.

B. Load motion-estimation vector registers VRME0–15 with initial search area of 32 pixels by 16 lines. This would require 16 vector load instructions to load all 16-vector registers. Copy these to the SAD/Shift vector registers VRME_SHIFT<n> by using BSAD with Load (L) option. Load and SAD could be specified in one instruction.

C. Horizontal search within the area of 16 pixels over a 32-wide window: 256 SAD calculations while shifting Group A vectors register elements left by one:
BSAD.s [X, Y]

D. Concurrent with step C, load the motion vector registers, VRME0–15 with the next search area in either vertical or horizontal direction. Loading of horizontal adjacent block would require 16-load operation, and vertical shift by one would require one load operation. Either of these could be performed concurrently and in the background while SAD calculations are done. Vertical search by LVME instruction, which loads a new value into VRME15 and shifts all motion-estimation vector registers by one in unison toward VRME0.

The steps C and D are repeated until the search area is exhausted.

DMA of preferred embodiment has the capability to perform transfer of 2-D sub-blocks of video pixels from external memory. During this transfer, the DMA engine also supports subsampling of data in both dimensions by factors of {2,4,8,16}. Hierarchical search at different pixel resolution levels could be done to reduce performance requirements. Multiple levels of pixel resolution, referred to as MIPMAP levels present is DMA transferred to local memory, and search is first done at the lowest resolution. Then, once the best match is found, only the neighborhood of the best match is search in the next lower resolution, continuing into higher resolutions this way into the hierarchy.

Subsampling of vertical search positions could also be done loaded under software control as required by loading every Nth line of pixels into vector register.

To implement sub-pixel resolution, we could use SIMD instructions (i.e., vector as opposed to the 2-D block SAD instruction) for interpolation, followed by SAD calculation using the SAD Block logic, i.e., using 1-D instructions to calculate SAD on a line by line basis, since the number of sub-pixel positions to be searched is not that many.

I claim:

1. Two-dimensional template matching in a SIMD processor comprising:

A) a set of vector registers wherein each vector register comprises N elements,

B) one or more subset group of said vector registers with ability to shift all elements of multiple vector registers in unison in left or right direction, C) a subset group of said vector registers with ability to load in a ripple-through fashion, whereby loading the first or last vector register elements, causes all vector register elements for that group to shift from one vector registers' elements to adjacent vector registers' element in the direction away from the loaded vector register, D) a block matching execution unit operably coupled to two said vector register groups uses two sets of M pixels by K line block of values as inputs and calculates block matching value for all data positions of block in parallel, E) a vector load and store unit that handles transfers between said vector registers and data memory, F) a vector arithmetic unit for vector arithmetic and logical operations, and G) a program flow control unit, whereby best match for motion estimation is found by shifting said vector registers containing candidate block and its neighborhood vertically or horizontally, and calculating the two-dimensional template-match value at each shift step, and whereby, in an image coding system, block based motion estimation is performed in a programmable processor, wherein an instruction set extension hardware unit compares new block-matching value output with previous best match value, or a constant value if none was done before, and stores away the best match value and the corresponding horizontal and vertical position values for the best match, wherein certain elements of M by K block could be masked from SAD calculation using a mask register or one of the bits of reference block to signal masking for a given element position, whereby the effective block size is reduced, wherein block-matching calculations and vector load and store operations to perform search area update are performed in parallel, whereby a block-matching logic selects inputs from a certain set of registers, and the rest of the vector registers could be loaded concurrently with block matching calculations and/or shifting of vector register elements connected to block matching logic, wherein reference block of M by K values are stored as part of a group of vector registers and block matching logic inputs for reference block is operably connected to certain vector register elements, 4 wherein the value of M is 4, 8 or 16, wherein the value of K is 4, 8 or 16, wherein the value of N is 8, 16, 32, 64, 128, or 256.

2. SIMD processor of claim 1 wherein each element has 8-bits, 16-bits, 32-bits fixed, or 32-bits floating-point precision.

3. SIMD processor of claim 2 wherein Sum-Of-Absolute-Differences (SAD) or Mean-Square-Error (MSE) is used as the block matching criteria.

4. SIMD processor of claim 3 wherein MIPMAP levels of pixel resolution are brought to data memory by using a hardware video scaler and hierarchical search of these resolutions are done. At each level of resolution, best matching position is found and then search continues at the next more detailed resolution in the neighborhood of the higher resolution match position.

* * * * *